United States Patent [19]

Feder

[11] Patent Number: 4,917,454
[45] Date of Patent: Apr. 17, 1990

[54] IMAGE SCANNER EMPLOYING LIGHT PIPES AND AN IMAGING SENSOR ARRAY

[75] Inventor: Peretz Feder, Englewood, N.J.

[73] Assignee: Photon Imaging Corp., Edison, N.J.

[21] Appl. No.: 322,627

[22] Filed: Mar. 9, 1989

[51] Int. Cl.$^4$ ................................................ G02B 6/06
[52] U.S. Cl. .......................... 250/227.23; 250/227.28; 355/1; 350/96.29; 350/96.24
[58] Field of Search ............... 350/96.24, 96.25, 96.26, 350/96.29; 250/227; 355/1; 358/901

[56] References Cited

U.S. PATENT DOCUMENTS

| | | | |
|---|---|---|---|
| 3,184,732 | 5/1965 | Haynes | 350/96.28 X |
| 3,273,445 | 9/1966 | Siegmund | 350/96.27 |
| 4,570,063 | 2/1986 | De Bie et al. | 350/96.25 X |
| 4,674,834 | 6/1987 | Margolin | 350/96.24 X |
| 4,702,552 | 10/1987 | Margolin | 350/96.24 X |
| 4,815,816 | 3/1989 | Schneider | 350/96.24 X |

Primary Examiner—John D. Lee
Assistant Examiner—Akm E. Ullah
Attorney, Agent, or Firm—Herbert M. Shapiro

[57] ABSTRACT

A page scanner employing a plurality of light pipes such as optical fibers is gathered to provide a linear geometry at one end and merely gathered in a pigtail at the other. The pigtail is coupled optically to a photosensor array such as a CID which is accessible on a random access basis. The linear end is arranged astride a page to be scanned to define a scan segment across the page. During operation, the scan segment is exposed to light and the photosensors in the CID are read out in a sequence which organizes the pixel data in a proper sequence to correspond to the sequence of pixels in the linear end. The photosensors of the CID are all read with essentially identical soak-read times by accessing the sensors twice, the second time in a reverse order (and subsequent to the resetting to zero of all sensors in the array), and by storing and by normalizing the resulting data thus producing like exposure times for all sensors of the array and eliminating smearing.

12 Claims, 2 Drawing Sheets

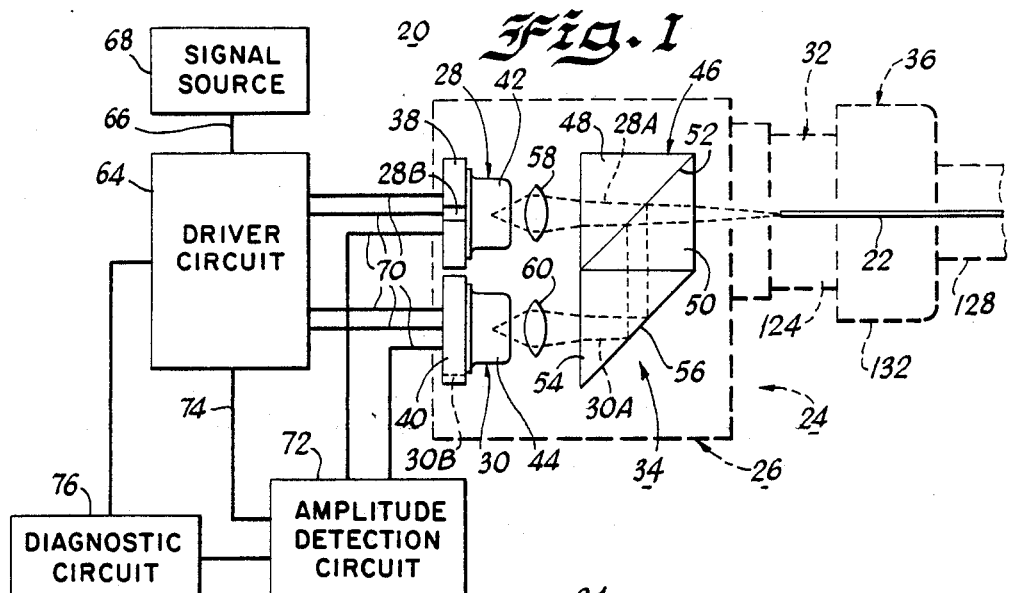
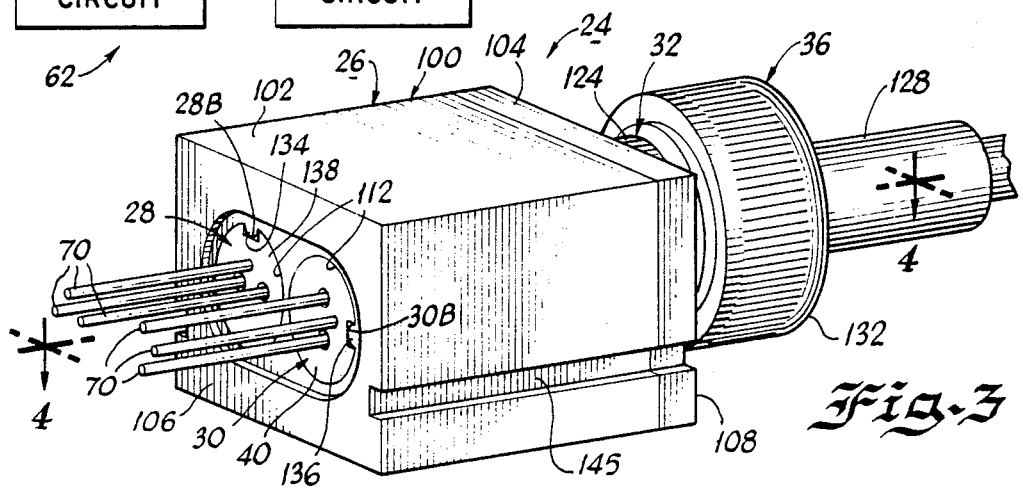
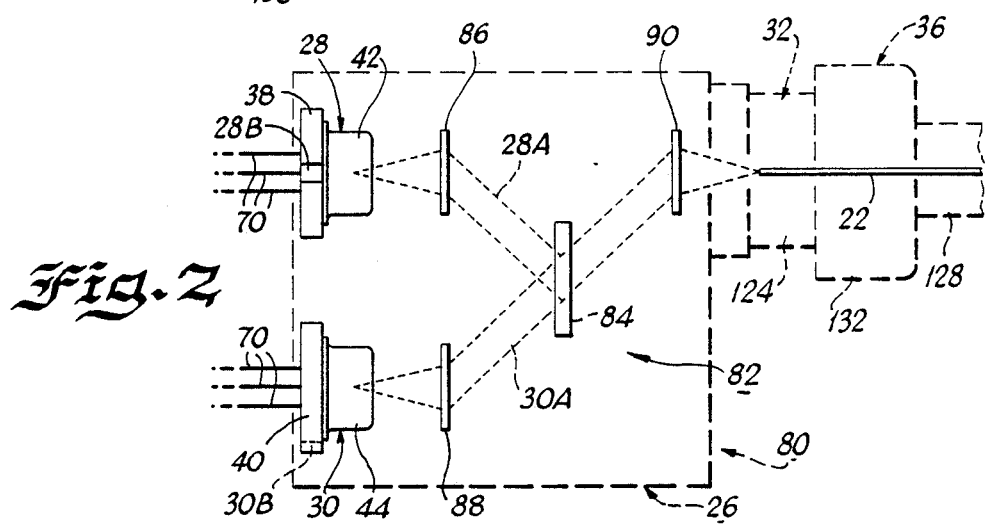

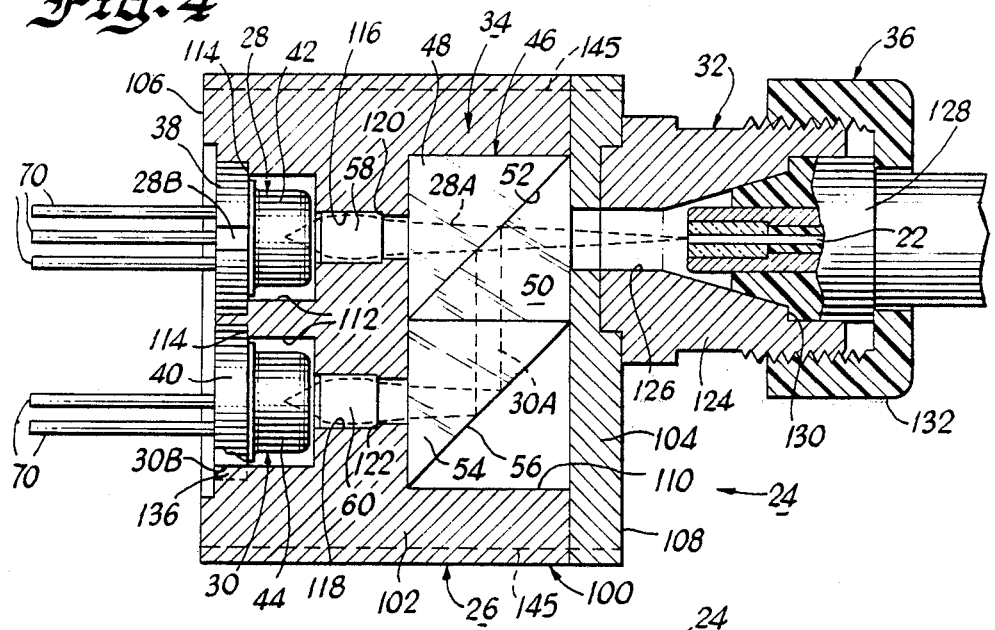
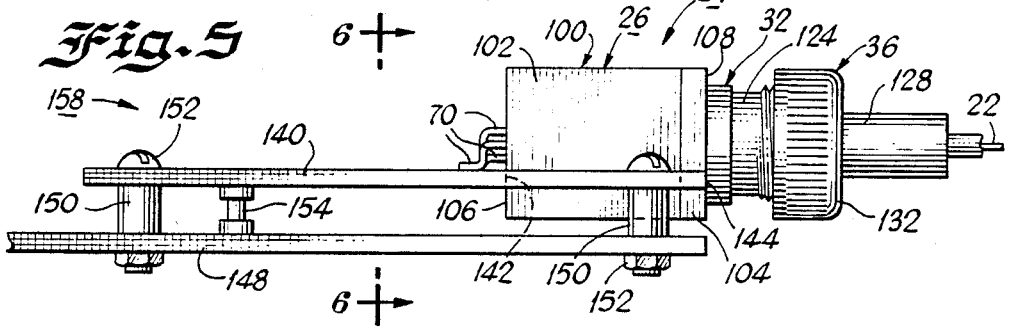
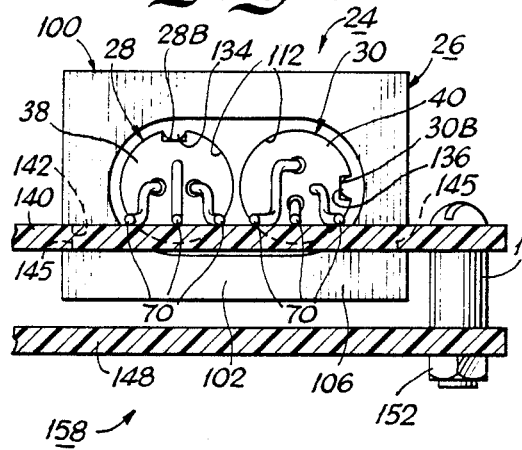
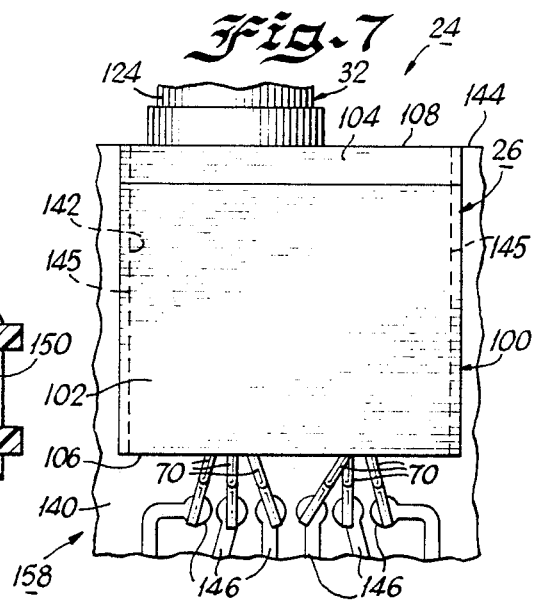

IMAGE SCANNER EMPLOYING LIGHT PIPES AND AN IMAGING SENSOR ARRAY

FIELD OF THE INVENTION

This invention relates to page scanners which employ light pipes such as a bundle of optical fibers. More particularly, this invention relates to a page scanner of the type disclosed in U.S. Pat. No. 4,674,834 issued June 23, 1987.

BACKGROUND OF THE INVENTION

U.S. Pat. No. 4,674,834 discloses a page scanner employing a fiber optic bundle which is linear at one end and rectangular at the other. The linear end defines a linear entrance field for light corresponding to a scan line or segment astride a page to be scanned. The other end of the bundle is gathered in a pig tail, fused, cut, and polished flat. The polished end defines an (area) exit field for the light emerging from the bundle and is optically coupled to a photosensor array of matching geometry.

The photosensor array, preferably comprises a plurality of discrete sensors accessible on a random access basis such as a dynamic random access memory (DRAM) as described in detail in the above noted patent or a charge injection device (CID) or photodiode array. A charge coupled device (CCD) can be used also but is relatively slow because it is organized on a sequential access basis.

A page scanner of the type disclosed in the above-noted patent employs a look-up table to relate the positions of the pixels in the entrance field with sensors of the sensor array. The look-up table includes the addresses of sensors in the sensor array chosen during an initialization procedure. The addresses so chosen are stored in a sequence to interrogate the sensors, during normal operation, in the proper sequence to organize the pixels exiting the exit face of the bundle to match the organization of those pixels at the entrance face.

The initialization procedure is carried out, for example, by passing a light slit, having a long dimension perpendicular to the axis of the entrance field, along that axis. The slit is moved in increments small compared to the diameter of a fiber. Thus, for a 5100 fiber bundle, 8½ inches long (600 dots per inch), the slit may be incremented between 12,000 and 20,000 steps. The sensor array includes a larger number of sensors (photosensitive detectors) than the number of fibers in the bundle. Thus, there are typically more than eight sensors for each fiber end. A sensor is selected for each fiber during an initialization procedure by one of several software programs as disclosed, for example, in U.S. Pat. No. 4,762,391 issued Aug. 9, 1988.

The look-up table is stored as an address sequence or string in a read only memory (ROM, typically a programmable ROM) and is read out from ROM each time the linear entrance field is moved down a page to each of the consecutive scan lines or segments of the page. That is to say, the page is moved, with respect to the linear field, to a scan segment and the scan segment is exposed to light. The reflected light enters the fibers, travels in the fiber, and impinges on the sensors. Consequently, the address string is used as pointers to access and organize the pixel data exiting the data field via the sensor array to correspond to the ordered sequence of fibers in the entrance field. The paper then is moved to the next scan segment and the operation repeats until the entire page is scanned.

It is to be understood that the fiber optic bundle is illustratively non-coherent. That is there is no known relationship between the positions of the ends of the fibers in the entrance field with the positions of the ends of the respective fibers in the exit field. Further, it is to be understood that the initialization procedure is carried out once during manufacture of the scanner and produces a ROM which becomes part of the finished product and is unique (has a unique address string) for each scanner manufactured. The initialization procedure can be carried out expeditiously and is expected, in mass production, to be accomplished in an average time on the order of seconds.

A problem which arises when a DRAM sensor array such as the Micron optical DRAM is used to sense a pattern of pixels is related to the fact that the DRAM does not operate as a true random access array when exposed to light. That is to say, when a DRAM is used as a light-sensitive array, it cannot be operated so that a single selected sensor can be exposed, read out, and refreshed for a subsequent cycle without also exposing and refreshing other sensors in the array. Because of the non-random operation, the sensors selected by the address string may be exposed to different exposure (soak-read cycle) times during normal operation of the scanner.

The exposure of the sensors to different soak-read cycle times is clearly demonstrated by an example. Let us assume that the exit field of a fiber optic bundle of an illustrative scanner is in a fixed position, either attached to or coupled via a lens, with respect to a random access type photosensor array (e.g. DRAM, CID) and the address string is determined and stored in ROM. It is clear that one can read the proper sequence of sensors may from left to right as one might view the sequence of fiber ends across the linear entrance field of the bundle. Let us also assume a realistic soak-read cycle time of 500 nanoseconds. For a 5100 fiber array, when the last sensor of the address string is read, its value represents a soak-read cycle time of over 2.55 milliseconds (5100×500 nanoseconds) whereas, the first sensor has a soak-read cycle time of 500 nanoseconds.

Another problem which arises for both DRAM and CID (charge injection device) area sensor arrays is one of smearing. Smearing occurs when the page being scanned is illuminated continuously rather than illuminated by pulsed light synchronized with the movement of the page.

Specifically, in operation, a cycle commences with the movement of the entrance face of the fiber bundle to a scan segment across the page—here assuming continuous illumination. Each sensor is reset, and precharged, as it is read. The sensor then integrates the subsequent light flux until it is read again, one cycle time later. The cycle time equals the time needed to step the page so that the next scan segment can be read. The step to the next scan segment occurs when the instant cycle is completed, just as the next cycle is about to begin.

Under such operating conditions, the charge accumulated on the photodetector corresponding to the first fiber in the entrance face represents the first pixel of the previous scan segment; the charge from the last fiber represents the last pixel of the instant scan segment. The charges accumulated from all other detectors is a mixture, in varying proportions, of the pixels of the previous and the instant scan segments. The worst case is at the center of the scan segment in which proportions are 50/50. Thus, at the center of a scan segment, the resolution is half that at the edges.

In color scanning, using time sequential color illumination, as is the case for many of the present generation of scanners, the colors are likewise mixed when an area sensor array accessible on a random access basis is used. The percentages of two colors that are mixed depends on when the colors are mixed in relation to reading instance. In any case, two of the color signals are always mixed in varying proportions across a scan segment.

BRIEF DESCRIPTION OF ILLUSTRATIVE EMBODIMENTS OF THIS INVENTION

The invention is directed at a simple and easily implemented strategy for avoiding smearing in random access sensor arrays and for achieving uniform soak-read cycle times for the sensors of a sensor array the addresses of which are selected for the address string of a scanner in accordance with the principles of the present invention. The strategy calls for reading the sensors of the address string, storing in a buffer memory the data so read out, resetting the array and reading the sensors of the address string again but in the reverse order, storing the data so read out also in a buffer memory, and averaging the (amplitude of) the "data" read out during the two readings. It is clear that the sensor corresponding to the fiber end at the extreme left of the linear entrance field receives exposures of 500 ns and over 2.55 ms respectively during the two readings whereas the fiber to the extreme end to the right receives the opposite exposures of over 2.55 ms and 500 ns respectively (assuming 500 ns for soak-read cycle time). The in-between fibers are read with soak-read cycle times which increment linearly providing increasingly longer exposures from left to right during the first reading and decreasing to provide increasing exposures from right to left during the second exposure so long as all the sensors are reset after each soak-read cycle forcing a new exposure cycle. The result is uniform exposure read cycle times for all sensors.

It is important to note that the sensors are randomly addressed and the entire array is reset simultaneously and instantly rather than individually upon reading as is normal.

In operation the scan head (entrance field) or the document is stepped "instantly" a scan segment at a time in the vertical direction. During the actual step period, the entire sensor array is totally reset. All information relating to the previous line is removed. Then the element address (pointers) string is provided and the appropriate sensors are read corresponding to the sequence fiber 1 through N, where N is the total number of fibers. In this case, fiber #1 produced virtually no signal because the elapsed time between reset and read is negligible. Fiber N produces a full signal because it has taken a significant time to read all the fibers. The entire sensor array is then reset. This time the address string is reversed and the fibers are read in the reverse sequence, N through 1. In each read operation, the resulting analog signal (from say a CID sensor array) is digitized (by an A to D converter) and stored in a buffer memory. The result of reading each element a second time is added to the result from reading the first time. Thus the signal stored in the buffer memory has two components. The sum corresponds to the same total integration time for each sensor. Thus the signal stored in the buffer is a representation of the pixels along a single scan segment only and each pixel signal is integrated for the same total time.

The linear face is again stepped and the cycle is repeated. During the repetition, the buffer memory is read out and the information for the new line is stored in a second buffer memory.

It is important to note that all sensors of the sensor array are reset simultaneously to zero signal just prior to starting the scan in either of the forward or the reverse directions for each scan segment.

A CID sensor is an analog sensor and thus is adaptable for use as a grey scale sensor array, voltage amplitudes, representative of the incident light, being provided at the outputs of the array. By providing consecutive readings of each scan segment as described above, a "grey scale" scanner is achieved using a CID. By providing consecutive readings first with red light, then with green, and then with blue (or yellow, cyan, and magenta) light, six readings in all, a color scanner is achieved. Light of different colors can be provided by introducing the light via the pigtail (exit face) of the fiber bundle by, for example, using a color wheel with an incandescent white light source directed at the scan segment defined on the page being scanned.

DETAILED DESCRIPTION OF ILLUSTRATIVE EMBODIMENTS OF THE INVENTION

The illustrative embodiments are being described in terms of a fiber optic bundle. It should be understood that any conductor of light such as a waveguide, stamped or deposited light pipes and the like may be used also. An illustrative fiber optic bundle typically comprises a plurality of fiber cores each with a cladding having an index of refraction lower than that of the core. This choice of indices of refraction causes light being transmitted in the core to be totally reflected internally by the interface between the core and the cladding.

As noted above, a scanner using a fiber optic bundle as disclosed in the above-mentioned patent, employs an area sensor array at the exit face of the bundle where the sensor array is interrogated according to an address string formed during an initialization procedure. The sequence of pixel representations (pointers), stored at the sequential addresses of the string, are used to read out of the sensor array sequentially, and are consequently stored sequentially in a buffer (linear memory). The sequence of pixels thus (now coherent as) determined by the address string, corresponds to the sequence of pixels at the entrance face of the bundle. Accordingly, the buffer contains a properly organized sequence of pixel-representative data to represent the image in the entrance face even though the fiber optic bundle might be non-coherent.

Figure 1:
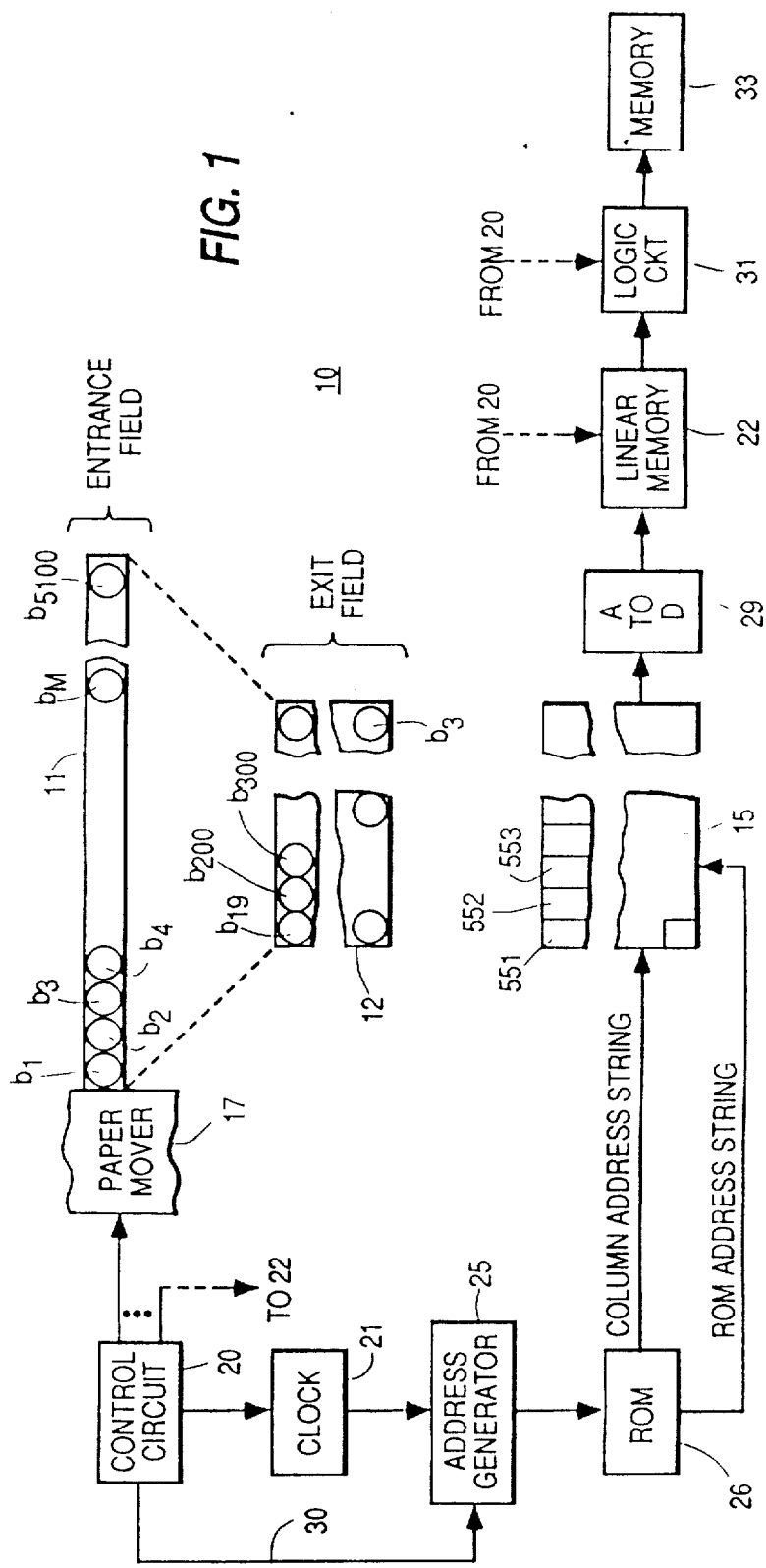
FIG. 1 is a schematic representation of a scanner system in accordance with the principles of this invention.

FIG. 1 shows a schematic representations of a page scanner 10 in accordance with the principles of this invention. The entrance field is represented by broken rectangle 11. The fiber ends in the entrance field are represented by circles (representing bits) $b_1, b_2, b_3$ - - - $b_m$ - - - $b_{5100}$ to correspond to a fifty one hundred fiber bundle (600 bits per inch) organized in an ideally linear entrance field.

The exit field is represented by broken rectangle 12. The fibers at the exit field are fused into a nominally rectangular shape which is an arbitrary shape to optically couple at least a portion of a commercially available sensor array. The fibers at the exit field are cut and polished flat. In the illustrative embodiment, the bundle is non-coherent. Thus there is no correspondence between the positions of the fibers in the entrance field and those in the exit field. This lack of positional correspondence is represented by the designation of circles within square 12. For example, pixel (bits) $b_{19}$ may appear at the upper left hand fiber position (circle) of square 12 whereas pixel $b_3$ might appear at the lower right hand position (circle) as shown. Pixel $b_{200}$ may appear next to pixel $b_{19}$ in the exit field; Pixel $b_{300}$ may be next as shown. This organization is quite different from that shown in rectangle 11.

The exit field is, illustratively, affixed to an optical sensor array represented by broken square 15. The array comprises a plurality of discrete optical sensors (i.e., CID) arranged in rows and columns and accessible on a random access basis. That is to say, the array is organized so that a selected sensor can be read and reset individually. Charge Injection Devices suitable for this purpose are available commercially from CIDTEC of Liverpool, New York.

Each fiber in the fiber optic bundle, although itself small compared to the size of the human hair, is large compared to a sensor in the sensor array. Thus, the area of, say, a fifty one hundred fiber optic bundle of an illustrative embodiment (the exit face) corresponds to a smaller area than that of a thirty two thousand sensor array. Each pixel (fiber) in the exit face thus corresponds to a set of between 8 and 18 sensors. This relationship is indicated by squares $SS_1, SS_2, SS_3$ - - - where the designation $SS_i$ stands for "sensor set" where i is a variable..

The position of the entrance field with respect to a page to be scanned is determined by a mechanical means represented by block 17. The mechanical means may comprise nothing more than motor driven pinch rollers which are in common use. The rollers move a paper so that the entrance field is positioned astride a page to image consecutive scan lines or segments of the page. Typically, there are in excess of three thousand scan lines for a single page.

At each scan segment, the page is illuminated and the sensor array is interrogated exactly as described in the above-mentioned patent. The operation in each instance is controlled by control circuit 20. Circuit 20 is shown connected to mechanical paper mover means 17 and to a clock 21. Clock 21 is operative to control a lamp (not shown), to initiate the sequential address string, to organize the pixels for each scan segment and to move the sequence of pixels into a (linear) memory 22. In this manner, the information in memory 22 is completely representative of the information at the entrance field and can be processed or transmitted in a manner well understood in the art.

In order to generate an address string, the scanner includes an address generator 25, the output of which is connected to a ROM 26. An output of clock 21 is connected to address generator 25. Each clock pulse is operative to increment the address generator causing the latter to scan through the addresses stored in ROM in a sequence of ROM (pointers) addresses. The address generator, specifically, applies an address to ROM 26 (initially a start-of-sequence address) and increments in response to each subsequent clock pulse. ROM 26 responds to generate the address string stored in ROM starting at the start-of-sequence address applied by the address register.

In accordance with the principle of this invention, the address sequence is applied twice, the second time in reverse (after resetting all the sensors to zero), for each scan segment of a page being scanned. Accordingly, the address string (0–5100) is stored, illustratively, twice in ROM 26, the second time in reverse (5100–0) and in sequential positions in ROM 26 starting at a second start-of-sequence address. Of course, this second start-of-sequence address may be the 5101th address in ROM, in which case, the new (double-length) address string is 0–10, 200 rather than 0–5100 where the last 5100 addresses store the reverse sequence. Alternatively, control circuit 20 can include means for controlling address generator 25 (and/or ROM 26) so that the sequence is applied in reverse after the first 5100 addresses are read out. Control circuit 20 is shown connected to address generator 25 by arrow 30 for this purpose. Of course, the circuitry can be implemented in a single microprocessor to provide such operation.

The address sequence is applied to sensor array 15 by means of an address decoder which is considered to be included in sensor array 15. The operation of the decoder is described in U.S. Pat. No. 4,674,834 noted above, the address string being applied over column and row lines so designated in the figure. The output of sensor array 15 is applied to an analog to digital (A to D) converter 29 which produces bits to be stored in linear memory 22.

Consider the embodiment where sensor array 15 comprises CIDs. The output of a CID element is a voltage representative of the soak-read cycle time or exposure time to which that particular sensor is subjected. That voltage is encoded by an A to D converter 29, the output of which is connected to the input to linear memory 22. The A to D converter applies 6 to 8 bits representative of the voltage value of the corresponding sensor to the linear memory. The output of the linear memory is applied to logic circuit 31 (also controlled by circuit 20) operative to add the digital representations of the two voltage values obtained for each sensor. The added values may be used directly, or the result may be normalized. The thus calculated values are outputted for storage in a memory array 33. Memory array 33 conveniently is mapped in a computer memory address space and may be used, for example, to display the scanned image on a monitor, to print it out or to transmit the image via a modem.

Figure 2:
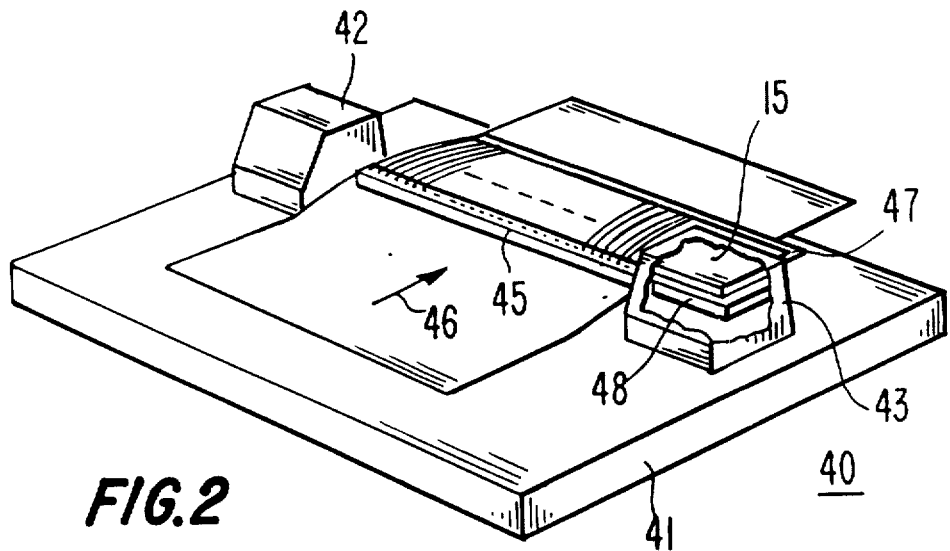
FIG. 2 is a plan view, partially cut away, of a scanner in accordance with the principles of this invention.

The physical organization of the scanner is shown in FIG. 2. The scanner 40 of FIG. 2 comprises a support 41 on which two housing 42 and 43 are secured. Housing 42 contains a mechanical drive (17 of FIG. 1) to move pinch rollers (not shown). Housing 43 contains the electronics of FIG. 1. The linear entrance (face or) field (11 of FIG. 1) is constrained into a linear geometry by ferrule 45 extending between the two housings as shown in FIG. 2. A page is advanced by the pinch rollers in a direction indicated by arrow 46.

The exit field of the fiber optic bundle (12 of FIG. 1) is gathered in a pig tail at 47 for coupling to sensor array 15. The electronics of FIG. 1 is included in component 48. Sensor array 15 and component 48 are viewed via the cut away section of housing 43 in FIG. 2.

As was stated above, two address sequences reflecting the relevant photosensors, one reversed from the other are applied (after reset) to sensor array 15 during each linear scan segment of a page being scanned. A scan segment of a page is defined as that segment of a page imaged onto the linear entrance field when the page, or at least the scan segment of the page which is illuminated.

Figure 3:
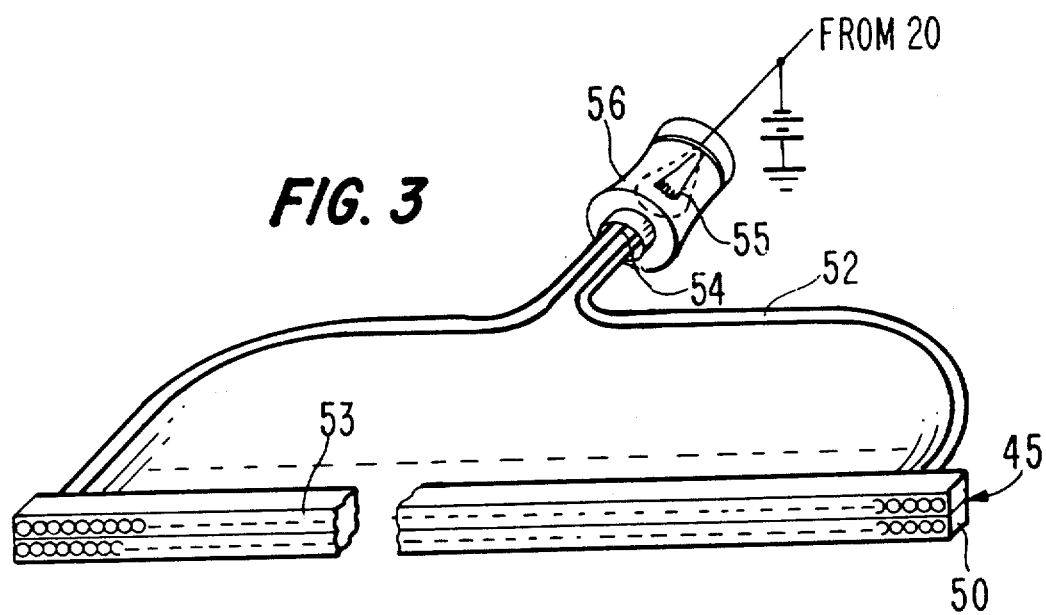
FIG. 3 is a plan view of the optical sub-system of the scanner of FIGS. 1 and 2.

FIG. 3 shows one mode of illuminating a scan segment of a page being scanned. The figure shows a bottom view of ferrule 45 of FIG. 2, the part which images the scan segment. The linear entrance field is designated 50 in FIG. 3. The figure shows an additional bundle of fibers 52. The additional bundle also is linear at end 53 and formed into a pig tail at end 54. An incandescent lamp 55 is secured to end 54 by fixture 56 for introducing light into end 54. A lens (not shown) may be present at linear end 53 of the additional bundle to focus the light properly onto the scan segment for imaging onto linear end 50 of the imaging bundle. Alternatively, a plastic film with a cladding on each of its surfaces may be used for an illuminator. One end of the film may be rolled tightly at the input end for receiving light from the lamp. The other end of the film is flat having its edge positioned as are the fiber ends at 53 of FIG. 3.

Inasmuch as the output of the CID or photodiode array are voltages representative of the incident light exposure, grey scale is achieved. A color image is produced as well by providing, for example, red, green and blue light and by applying two address strings (one reversed) to the sensor array for each color. In this instance, also, all the sensors of the array are reset to zero between the first and the reverse address string applied for each color and between the strings applied for consecutive colors. For a color image, six address strings and six resets are applied leading to a fifteen millisecond (153 ms) overall exposure time, the sensor array being reset after each of the address strings is applied (i.e. every 2.55 ms). If we assume 4400 scan segments per eleven inch page, a color image of the page can be produced in this manner in about 67 seconds. A grey scale image can be produced in about 11 seconds.

Figure 4:
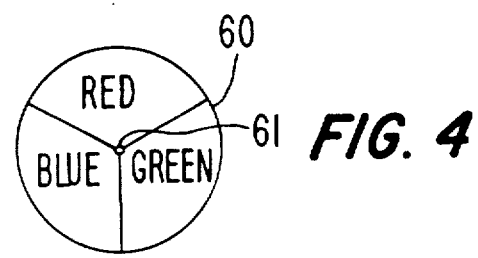
FIG. 4 is a schematic representation of a color wheel portion of an optical sub-system of the type shown in FIG. 3.

FIG. 4 shows a color wheel 60 which would be located in fixture 56 of FIG. 3. The wheel is rotated in a manner synchronous with the six address strings under the control of a control circuit (20 of FIG. 1). The organization of a color embodiment is analogous to that of the embodiment of FIG. 1 except for the control circuit. The control circuit in a color embodiment is operative to associate the consecutive outputs of logic circuit 31 of FIG. 1 so that the red, green and blue images of a scan segment can be manipulated from storage in memory 33 to produce a color image.

The use of a color wheel as well as its operation are well understood in the art. The technology was developed as an alternative approach to color television and is not discussed in detail here. The wheel conveniently is rotated on an axis 61 offset from lamp 55 so that different color segments of the wheel are disposed between the lamp and end 54 of the fiber optic bundle (see FIG. 3).

Although the invention has been disclosed in terms of a page scanner with a linear entrance field and a rectangular exit field, such geometries are arbitrary and are chosen illustratively for use with the scanning of a page and for imaging onto a commercially available chip. Other geometries may be used and the geometries at the two ends of the bundle may be the same as would be the case for medical scope embodiments or machine vision applications. Moreover, the end 54 of the fiber optic bundle may be imaged onto only a small portion of a sensor array rather than onto the entire sensor array.

What is claimed is:

1. A scanner comprising a plurality of light pipes arranged in a bundle having first and second ends organized in first and second geometries respectively, said scanner also including an array of photosensors organized on a random access basis, means for coupling said second ends to said array optically, means for exposing said array to light through said light pipes for a sequence of preselected time periods, means for reading selected sensors of said array during a first of said time periods according to an address string for organizing pixel data at said second ends to match pixel positions at said first ends, means for resetting all sensors in the array, means for rereading said selected sensors in accordance with said address string in the reverse order during a second of said time periods, and means for processing the output of each of said sensors obtained during said first and second time periods in a manner to produce like exposure times for all sensors of said array which are so read and for eliminating smearing.

2. A scanner in accordance with claim 1 wherein said plurality of fibers comprises an optical fiber bundle and said first and second ends are organized along an ideally linear axis to define an entrance field and in an area geometry to define an area exit field respectively.

3. A scanner in accordance with claim 2 wherein said sensor array includes a plurality of sensors corresponding to each fiber coupled to it.

4. A scanner in accordance with claim 3 wherein said address string is stored in a ROM, said scanner also including control means for initiating said first of said exposure time periods and said address string simultaneously.

5. A scanner in accordance with claim 4 wherein said control means also includes said means for resetting said array and means for initiating said second exposure time period and said address string in reverse simultaneously after the resetting of all sensors.

6. A scanner in accordance with claim 3 wherein said ROM also includes said address string in reverse order.

7. A scanner in accordance with claim 3 wherein said address string and said address string in reverse order are stored in said ROM in consecutive ROM addresses and said control means includes means for sequencing through said ROM addresses and for activating said means for exposing synchronously.

8. A scanner in accordance with claim 7 including means for exposing said page to a succession of first second and third colors and means for associating the outputs obtained from said ROM during the exposures to provide a color image.

9. A scanner in accordance with claim 8 wherein said control means includes means for applying six alternating forward and reverse address sequences to said sensor array, and means for resetting all sensors of said array between each address string at each scan segment of an image being scanned.

10. The method of operating a fiber optic image scanner comprising a fiber optic bundle extending between a first entrance face and a second exit face coupled to an array of photosensors accessible on a random access basis wherein a predetermined sequence of sensor addresses related the pixel positions in said entrance face to the addresses of sensors in said array, said method comprising the steps of illuminating a scan segment of an image to be scanned which is coupled to said first face, reading the sensors of said sequence a first time, storing the data so read out, resetting said array, reading the sensors of said sequence a second time but in reverse order, storing the data read out, processing the data read out during said first and second times for obtaining a representative reading from each of said sensors corresponding to like exposure times for said sensors, and repeating said steps for each consecutive scan segment of said page.

11. The method in accordance with claim 10 wherein the step of processing the data comprises averaging the readings taken during said first and second times.

12. The method in accordance with claim 11 wherein the steps of illuminating each scan segment of an image comprise illuminating said consecutively with first, second, and third color light, and said steps of reading a first time, resetting, and rereading a second time are carried out during the illumination with each color light.

* * * * *

UNITED STATES PATENT AND TRADEMARK OFFICE
CERTIFICATE OF CORRECTION

PATENT NO. : 4,917,454

DATED : April 17, 1990

INVENTOR(S) : Feder

Page 1 of 4

It is certified that error appears in the above-identified patent and that said Letters Patent is hereby corrected as shown below:

The title page should be deleted to appear as per attached title page.

The sheets of drawing consisting of figures 1-7 should be deleted to appear as per attached sheets.

Signed and Sealed this

Twentieth Day of August, 1991

*Attest:*

*Attesting Officer*

HARRY F. MANBECK, JR.

*Commissioner of Patents and Trademarks*

United States Patent [19]

Feder

[11] Patent Number: 4,917,454
[45] Date of Patent: Apr. 17, 1990

[54] IMAGE SCANNER EMPLOYING LIGHT PIPES AND AN IMAGING SENSOR ARRAY

[75] Inventor: Peretz Feder, Englewood, N.J.

[73] Assignee: Photon Imaging Corp., Edison, N.J.

[21] Appl. No.: 322,627

[22] Filed: Mar. 9, 1989

[51] Int. Cl.⁴ .................................. G02B 6/06
[52] U.S. Cl. ...................... 250/227.23; 250/227.28; 355/1; 350/96.29; 350/96.24
[58] Field of Search ............... 350/96.24, 96.25, 96.26, 350/96.29; 250/227; 355/1; 358/901

[56]     References Cited
     U.S. PATENT DOCUMENTS

| | | | |
|---|---|---|---|
| 3,184,732 | 5/1965 | Haynes | 350/96.28 X |
| 3,273,445 | 9/1966 | Siegmund | 350/96.27 |
| 4,570,063 | 2/1986 | De Bie et al. | 350/96.25 X |
| 4,674,834 | 6/1987 | Margolin | 350/96.24 X |
| 4,702,552 | 10/1987 | Margolin | 350/96.24 X |
| 4,815,816 | 3/1989 | Schneider | 350/96.24 X |

*Primary Examiner*—John D. Lee
*Assistant Examiner*—Akm E. Ullah
*Attorney, Agent, or Firm*—Herbert M. Shapiro

[57]         ABSTRACT

A page scanner employing a plurality of light pipes such as optical fibers is gathered to provide a linear geometry at one end and merely gathered in a pigtail at the other. The pigtail is coupled optically to a photosensor array such as a CID which is accessible on a random access basis. The linear end is arranged astride a page to be scanned to define a scan segment across the page. During operation, the scan segment is exposed to light and the photosensors in the CID are read out in a sequence which organizes the pixel data in a proper sequence to correspond to the sequence of pixels in the linear end. The photosensors of the CID are all read with essentially identical soak-read times by accessing the sensors twice, the second time in a reverse order (and subsequent to the resetting to zero of all sensors in the array), and by storing and by normalizing the resulting data thus producing like exposure times for all sensors of the array and eliminating smearing.

12 Claims, 2 Drawing Sheets

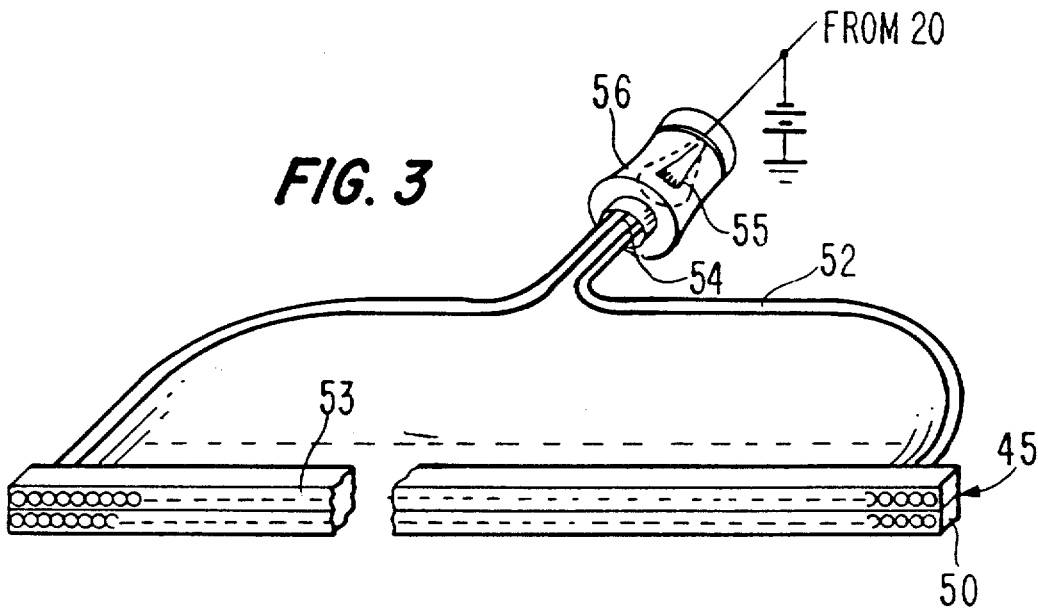

FIG. 3